Dec. 13, 1927.
J. M. NAUL
1,652,492
ELECTRIC MOTOR AND TRANSMITTER UNIT
Filed May 9, 1925  2 Sheets-Sheet 2
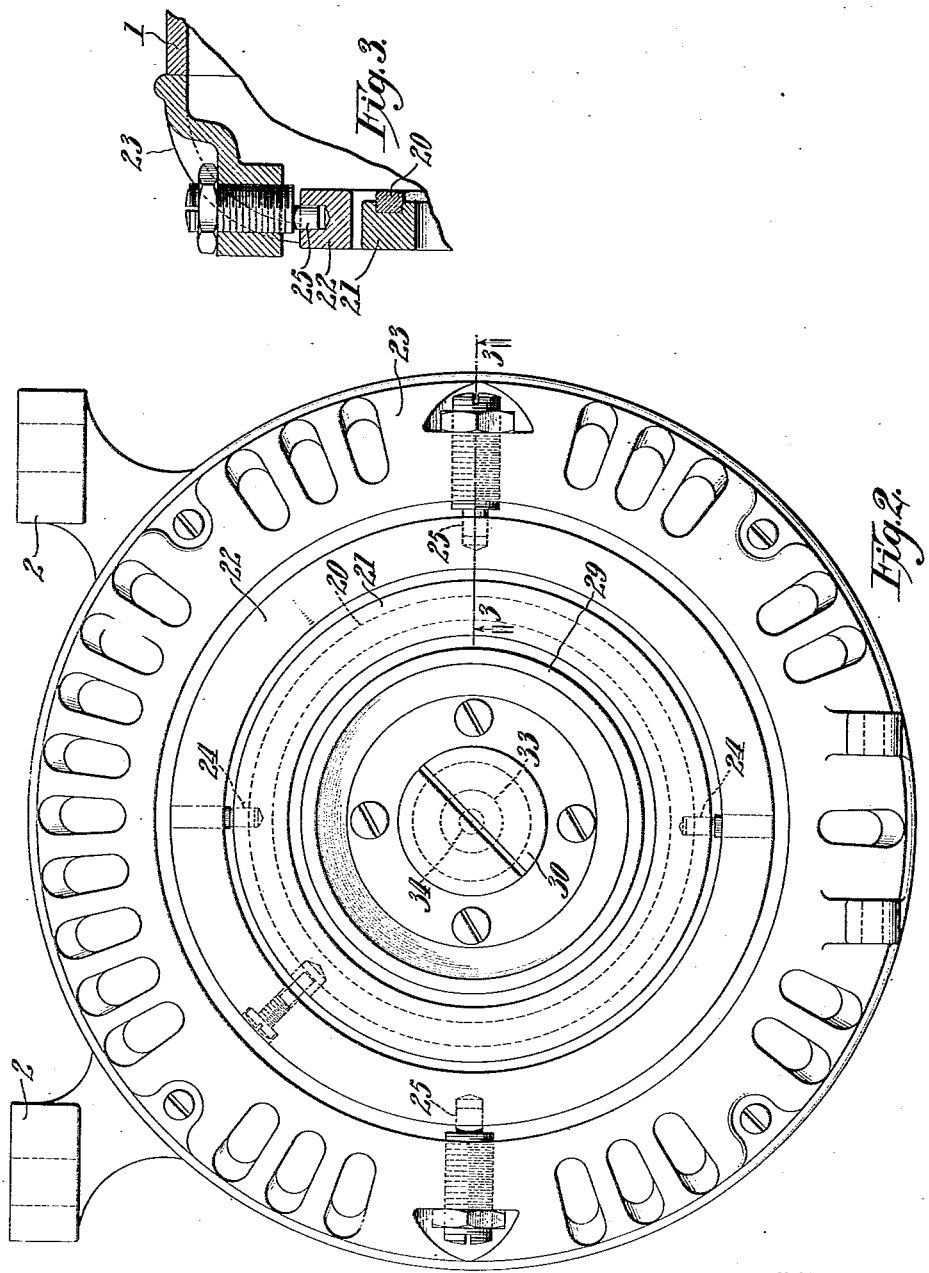

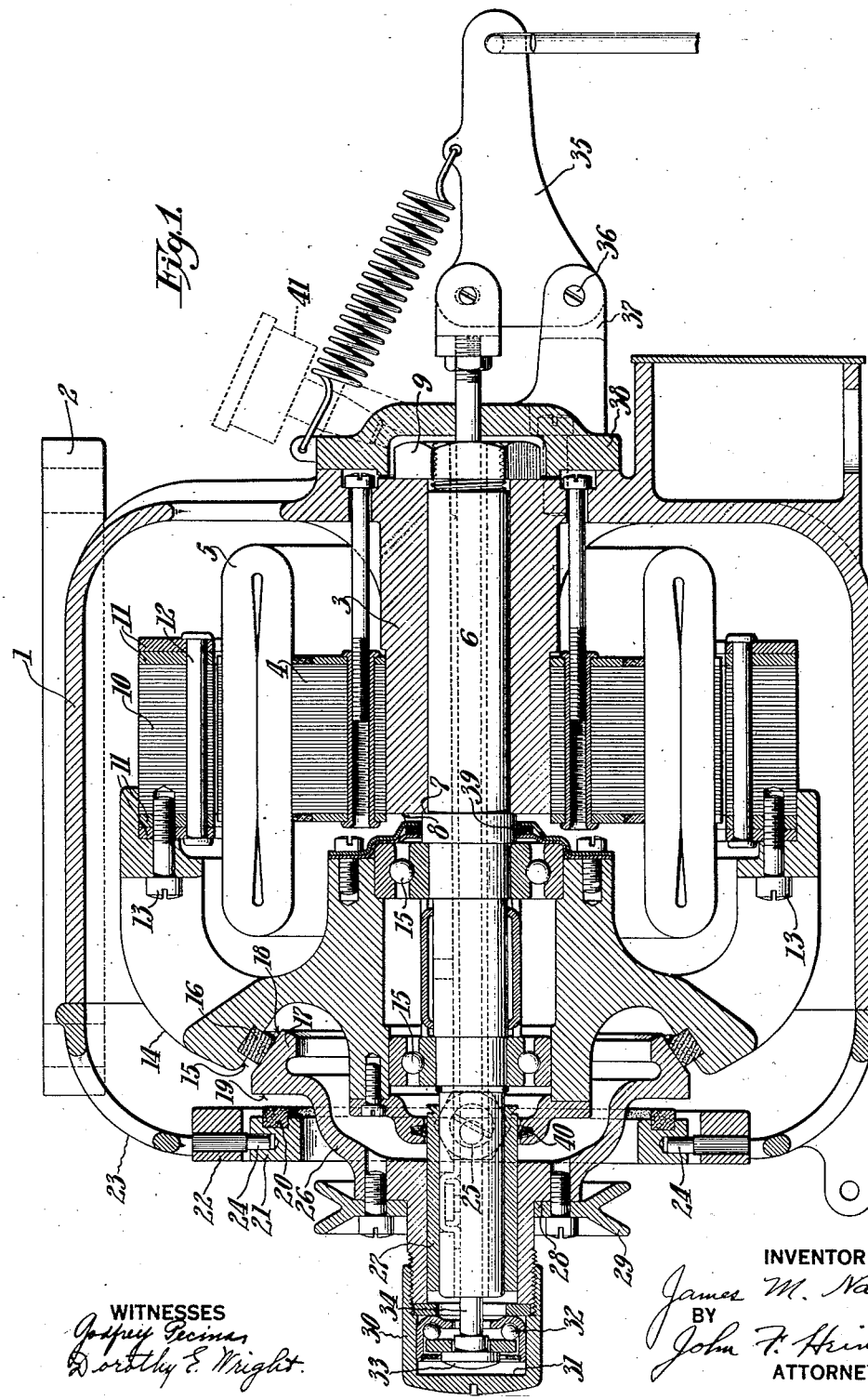

Patented Dec. 13, 1927.

1,652,492

UNITED STATES PATENT OFFICE.

JAMES M. NAUL, OF PLAINFIELD, NEW JERSEY, ASSIGNOR TO THE SINGER MANUFACTURING COMPANY, OF ELIZABETH, NEW JERSEY, A CORPORATION OF NEW JERSEY.

ELECTRIC MOTOR AND TRANSMITTER UNIT.

Application filed May 9, 1925. Serial No. 28,999.

This invention relates to electric power-transmitters of the type adapted for the individual operation of sewing or other small machines which require to be frequently started and stopped at the will of the operator.

An object of the invention is to improve the construction disclosed in my copending application Serial No. 751,299, filed November 21, 1924, by reducing the friction losses in the transmitter when the driven machine is stationary.

A further object of the invention is to simplify the construction disclosed in my said copending application to the end of expediting the manufacture and assembling thereof.

To the attainment of the ends in view, the rotary shaft of my prior construction has been replaced by a stationary shaft which is fixed in the inwardly extending central tubular frame portion which supports the stationary element of the coacting stationary and rotary electro-magnetic motor-elements. The rotary electro-magnetic motor-element is journaled on the stationary shaft adjacent the inner end of the central tubular frame portion and the driven clutch-member is also journaled on the stationary shaft independently of the bearing for the rotary motor-element. By this arrangement friction losses between the driven clutch-member and its support are eliminated when the driven clutch-member is idle. As the stationary shaft is supported at one end only, it is a simple matter to slip the running parts to working position on such shaft, without disturbing the latter.

A fuller understanding of the invention may be had from the following detailed description of a preferred embodiment thereof, accompanied by drawings of which Fig. 1 is a longitudinal section of the complete electric unit. Fig. 2 is a left end-elevation and Fig. 3 is a fragmentary section on the line 3—3, Fig. 2.

In the preferred embodiment of the invention illustrated, the motor-transmitter unit is formed with a hollow cylindrical frame 1 having the attaching feet 2 and the inwardly extending central tubular frame-portion 3 on which is tightly fitted the stationary electro-magnetic element 4 of an electric motor having a winding 5 of any desired type; the present winding being the usual four-pole three-phase winding. Fixed in the frame portion 3 is the hollow stationary shaft 6 having its shoulder 7 held firmly in contact with the end-wall 8 of the frame-portion 3 by means of the nut 9 which is screwed onto the end of the shaft 6.

The rotary electro-magnetic member of the motor is disposed externally of the stationary member 4 and is constituted by an ordinary ring type squirrel-cage rotor including the iron laminations 10, and conductor rings 11 and conductor bars 12. The rotor element is secured by screws 13 to the spider 14 which is journaled on ball bearings 15 sustained by the stationary shaft 6. The spider 14 and external rotor 10 constitute a heavy fly-wheel, the element 14 of which is formed with a conical friction clutch face 15 lined with the clutch leather 16.

The driven clutch-member 17 is formed with a clutch face 18 mating with that of the driving clutch-member 14 and is also formed with a flat breaking surface 19 which is adapted to engage the brake leather 20 carried by the brake-ring 21 which does not rotate but floats in a gimbal ring 22 sustained by the end frame element 23. The brake-ring 21 is mounted on the diametrically opposed pins 24 which are carried by the gimbal ring 22; the latter being mounted on the eccentric pins 25 adjustably fixed in the end frame element 23.

The hub 26 of the driven clutch-member 17 extends through the ring 21 and is journaled on the shaft 6 by means of the bearing bushing 27 which is tightly fitted to the central aperture in the member 17. The hub 26 is formed with a shoulder 28 to which is secured the belt-pulley 29 to be connected to the machine to be driven. The hub 26 is threaded at its outer end to receive the end-cap 30 between the inner wall 31 of the head of which and the ball-thrust bearing 32 is disposed the head 33 of the push-and-pull rod 34 extending through the hollow stationary shaft 6 and connected at its other end to the treadle controlled lever 35 which is fulcrumed at 36 in the bifurcated lug 37 formed on the frame cap 38 covering the nut 9.

The rotary member 14 is provided with suitable lubricant wiping rings 39, 40, the latter of which engages the inner end of the bushing 27. Lubricant is supplied by means of the grease cup 41 and flows through the hollow shaft 6 to the several bearings.

The laminations for the stationary motor member 4 are provided with suitable longitudinally extending ventilating ducts, not shown.

Having thus set forth the nature of the invention, what I claim herein is:—

1. An electric power-transmitter comprising, in combination, a frame, a stationary shaft fixedly supported at one end only by said frame, coacting electro-magnetic stationary and rotary motor-elements coaxial with said shaft, said rotary motor-element being journaled on said shaft, a driven element also journaled on said shaft adjacent the free end of the latter, a manually controlled clutch connection between said driven element and rotary motor-element, and a belt-pulley associated with said driven element coaxial with said shaft.

2. An electric power-transmitter comprising a hollow cylindrical frame, a stationary shaft coaxial with and supported entirely by one end wall of said frame, the other end of said shaft extending through an opening in the other end wall of said frame without touching the latter, coacting rotary and stationary electro-magnetic motor-elements mounted in said frame, said rotary motor-element being journaled on said shaft, a connected driven element and belt-pulley also journaled on said shaft, and a manually controlled friction clutch connection between said driven and rotary motor-elements.

3. An electric power-transmitter comprising, in combination, a frame, a stationary hollow shaft fixed in said frame, a motor propelled driving clutch-member journaled on said stationary shaft, a mating clutch-member slidably and rotatably journaled on said shaft at one end of the bearing for the driving clutch-member, and a manually operated rod passing through said stationary shaft and connected to slide said mating clutch-member toward and away from the driving clutch-member.

4. An electric power-transmitter comprising, a hollow frame having an internal tubular portion, a stationary motor-element mounted on said tubular portion, a stationary shaft fixed in said tubular portion, a rotary motor-element disposed externally of said stationary motor-element and journaled on said shaft, a driven member journaled on said shaft, and a manually controlled friction clutch connection between said driven member and rotary motor-element.

5. An electric power-transmitter comprising a hollow frame having an inwardly projecting tubular portion, a stationary motor-element fixed to said portion, a rotary motor-element disposed externally of said stationary motor-element, a stationary shaft fixed in said tubular portion, a spider journaled on said shaft and carrying said rotary motor-element, said spider having a driving friction clutch-face, a driven clutch-member rotatably and slidably journaled on said shaft, and manually operated means for sliding said driven clutch-member.

In testimony whereof, I have signed my name to this specification.

JAMES M. NAUL.